United States Patent [19]

Bauer et al.

[11] Patent Number: 4,501,239
[45] Date of Patent: Feb. 26, 1985

[54] AIR-COMPRESSING, DIRECT-INJECTION INTERNAL COMBUSTION ENGINE

[75] Inventors: Friedrich Bauer, Schwanstetten; Kurt Leonhard, Nuremberg, both of Fed. Rep. of Germany

[73] Assignee: M.A.N. Maschinenfabrik Augsburg-Nurnberg Aktiengesellschaft, Nuremberg, Fed. Rep. of Germany

[21] Appl. No.: 382,581

[22] Filed: May 27, 1982

[30] Foreign Application Priority Data

May 29, 1981 [DE] Fed. Rep. of Germany ....... 3121344

[51] Int. Cl.³ .............................................. F02B 23/06
[52] U.S. Cl. .................................... 123/261; 123/276; 123/279
[58] Field of Search ............... 123/261, 262, 263, 276, 123/279, 193 P

[56] References Cited

U.S. PATENT DOCUMENTS

| 3,809,031 | 5/1974 | Meurer et al. | 123/263 |
| 3,814,066 | 6/1974 | Löhr | 123/263 |
| 4,294,206 | 10/1981 | Urlaub et al. | 123/276 |
| 4,401,071 | 8/1983 | Zürner et al. | 123/276 |

FOREIGN PATENT DOCUMENTS

| 147386 | 4/1981 | Fed. Rep. of Germany | 123/276 |
| 52-4919 | 1/1977 | Japan | 123/276 |
| 53-16107 | 2/1978 | Japan | 123/276 |
| 2033006 | 4/1980 | United Kingdom | 123/263 |

Primary Examiner—Ira S. Lazarus
Assistant Examiner—R. S. Bailey
Attorney, Agent, or Firm—Becker & Becker

[57] ABSTRACT

An air-compressing, direct injection internal combustion engine in which the piston is formed with a combustion chamber in the shape of a solid of revolution and a constricted throat opening, and where mixture formation is predominantly by fuel deposition on the walls of the combustion chamber. The function of the internal combustion engine is proposed to be improved so that, by influencing the squish flow occurring as air in inducted into the combustion chamber, improved performance is obtained, especially in the lower and medium speed ranges of the engine. According to the new proposal, this is essentially achieved by forming the throat opening with an oval cross-section, adopting defined fuel jet directions when injecting the fuel, as well as keeping the location of the fuel discharge point within a defined area.

10 Claims, 4 Drawing Figures

AIR-COMPRESSING, DIRECT-INJECTION INTERNAL COMBUSTION ENGINE

The present invention relates to an air-compressing, direct-injection internal combustion engine having a combustion chamber in the shape of a solid of revolution in the piston with a constricted throat or transfer opening; a rotary motion about the longitudinal axis of the combustion chamber is imparted by means known per se to the in-flowing air for combustion; the fuel is injected into the combustion chamber, through a nozzle arranged off-center near the edge of the combustion chamber throat in the cylinder head, by means of only one jet in the direction of the rotating air for combustion in a manner permitting the formation of a fuel film on the combustion chamber wall, with the point of impingement of the fuel jet on the combustion chamber wall being situated in the lower quarter of the combustion chamber by appropriate selection of the nozzle angle and the nozzle position.

An internal combustion engine of this type was disclosed in German Pat. No. 20 38 048 corresponding to U.S. Pat. No. 3,814,066—Löhr issued June 4, 1974.

In internal combustion engines where mixture formation is mainly effected by wall (surface) deposition of the fuel, the air motion in the combustion chamber is of twofold importance; first, there is required to provide sufficiently fast and effective separation of the fuel prepared for combustion by the hot combustion chamber wall and, secondly, there is required subsequent mixing of the fuel with the air.

The air motion in this concept is brought about by two features: by the rotation of the air for combustion referred to (initial air rotation) about the longitudinal axis of the combustion chamber generated during the intake stroke, and by the fact that the combustion chamber narrows towards the throat, so that as the air enters the combustion chamber (during the compression stroke), a turbulent squish flow is produced. Obviously, it is the rotary motion symmetrical about the axis, which attains its highest velocity at the top dead center position of the piston, that is especially adapted for removing the sprayed-on fuel. However, since the air motion has to be sufficiently intense in order to enable the fuel to be removed quickly and positively, the designer will try to employ, in addition to the rotary motion, the squish flow, because the superimposition of the rotary horizontal flow of the intake air, of the flow occurring approximately at right angles to the latter as the air is transferred into the combustion chamber, causes intense turbulence, with the constricted throat providing a turbulence-assisting velocity increase of the transfer flow. This results in a rapidly progressing excellent mixture preparation and, as a consequence, a substantially improved combustion pattern. However, this applies mainly only to the upper speed range. In the lower speed range, high squish turbulence is liable to negatively affect combustion inasmuch as it may cause the fuel jet entering the combustion chamber, which has only a low kinetic energy in the low speed range, to be deflected towards the combustion chamber wall as it penetrates into the combustion chamber. In the lower speed range, however, it is desirable, because of the relatively cool combustion chamber wall, that wall deposition should be slight, with mixing of the fuel being preferably direct with the air.

In the internal combustion disclosed earlier, this is primarily achieved by the greater free trajectory of the fuel jet, assisted by a slightly greater diameter of the throat being selected, and also by lowering the rotary speed of the air in the combustion chamber.

It has now been found that squish turbulence or secondary turbulence in this internal combustion engine has often been the cause of combustion being not quite at an optimum in the lower speed range, since there is at least cause for the assumption that there is still too intensive deflection of the fuel jet towards the combustion chamber, which at this stage is still too cool. An even greater increase in the throat diameter, while affording further improvement in the lower speed range, would cause performance in the upper speed range to deteriorate considerably.

This is the starting point of the present invention of which an object is to control squish turbulence produced in an internal combustion engine of the type initially referred to in a simple and straightforward manner. Accordingly, in the area of the fuel admission into the combustion chamber, in such a way that with the fuel impingement area in the lower quarter of the combustion chamber chosen with a maximum width, and with a substantially free choice of the combustion chamber shape, the best possible reduction of blue smoke and white smoke formation is obtained at no load and in the lower and medium part load range of the engine, without the penalty of a deterioration of performance in the upper load and/or speed ranges.

This object, and other objects and advantages of the present invention, will appear more clearly from the following specification in connection with the accompanying drawings, in which.

Figure 1:
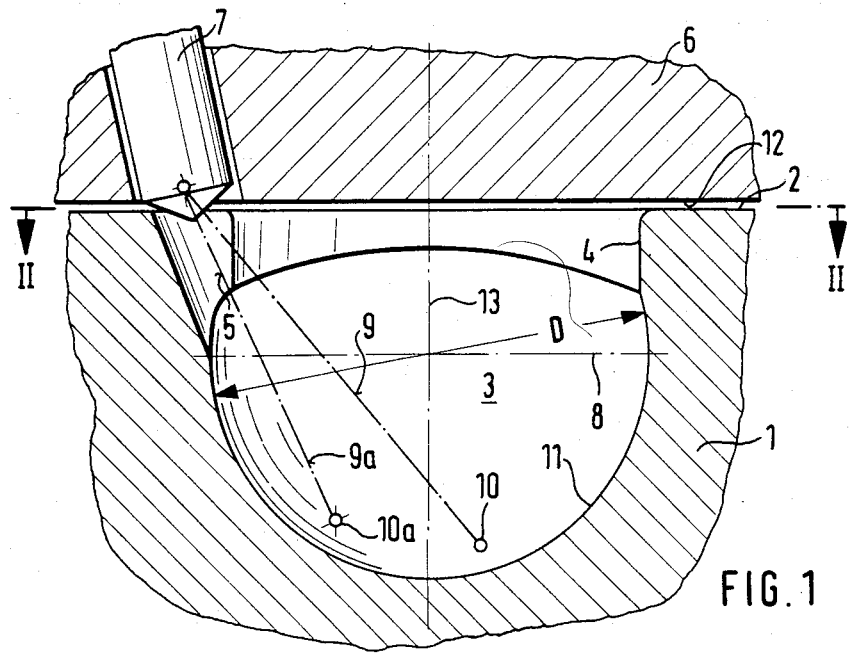
FIG. 1 is a longitudinal section through the upper part of a piston at top dead center with two geometrical fuel jets according to the invention.

The internal combustion engine of the present invention is characterized primarily in that the constricted throat opening has an oval cross-section and a varying height of the wall in the circumferential direction; in that, looking at a plan view of the combustion chamber, the major diameter of the throat across the combustion chamber center extends in the direction towards the fuel jet discharge point of the injection nozzle, with the distance of the fuel jet discharge point from the combustion chamber center being 0.35 to 0.70 times the combustion chamber diameter, and with the geometrical fuel jet direction, on the one hand projected into a plane perpendicular to the combustion chamber axis, forming an angle of 10° to 50° at the fuel discharge point with a straight line extending through the combustion chamber longitudinal axis (combustion chamber center) and, on the other hand, forming an angle of 20° to 60° with a plane perpendicular to the combustion chamber longitudinal axis.

As a result of the design and location of the throat opening according to the invention, squish turbulence in the area of the fuel admission into the combustion chamber is weakened in such a manner as to bring about less pronounced deflection of the fuel jet towards the combustion chamber wall within the indicated range of the location of the fuel discharge point and/or the angle ranges of the geometrical fuel jet directions. The explanation for this is as follows: first, as a result of the short distance of the combustion chamber opening from the cylinder wall in the end regions of the major diameter of the oval throat opening, the intensity of squish flow is reduced; secondly, there is also less undercutting in these regions of the combustion chamber side relative to the throat opening. Consequently, squish turbulence is imparted with less pronounced deflection towards the combustion chamber side or, respectively, the deflection is moved to a lower level in the combustion chamber in these regions due to the greater height of the wall, whereby the intensity of wall deposition of the fuel is reduced. The less pronounced squish turbulence thus has only a positive effect with respect to the deflection of the fuel jet relative to the wall, i.e., it assists direct mixing of the fuel with the air in the lower speed range. But in the upper speed and load ranges, too, there is no deterioration, and in particular because in the regions of the minor diameters of the throat opening, intense squish turbulence is always maintained, and/or the fuel jets which are more powerful in the upper speed range always reach the combustion chamber wall; and last but not least because of the higher revolutions per second or rps of the air swirl. Thus, improved preparation of the fuel for combustion is obtained in all speed ranges, which results in a distinct improvement of exhaust emission levels.

As a further development of the invention, it is advantageous to adopt a diameter ratio $d_1/d_2$ of the oval combustion chamber throat in a range between 1.05 and 1.25.

The position of the fuel discharge point may vary not only in a radial direction, but it may also deviate (within the specified distances from the combustion chamber center) by ±20° maximum from the direction of the major diameter $d_1$ of the throat.

The throat opening may have the form of an ellipse, or the form of an oblong hole formed from two semicircles and a straight intermediate area in the middle.

According to another development of the invention, the wall of the throat opening may be formed vertical, i.e. parallel to the combustion chamber longitudinal axis. In this case, the depth of the throat wall is greatest in the regions of the major diameter $d_1$, and smallest in the regions of the minor diameter $d_2$. It is advantageous to have the greatest throat wall depth between 15 and 20%, and the smallest wall depth between 5 and 10%, of the combustion chamber diameter D.

The rotary speed of the revolving air for combustion or air charge—relative to the measured diameter (0.7 cylinder or piston diameter), maximum valve lift, as well as 10 m/sec mean piston velocity—amounts to between 130 and 180 cps.

Where a spherical combustion chamber is adopted, an especially favorable combustion pattern will be obtained if the distance of the fuel discharge point from the combustion chamber center is 0.50 to 0.55 times the combustion chamber diameter, the angle $\gamma$ is between 15° and 40°, and the angle $\delta$ is between 40° and 50°, while the diameter ratio $d_1/d_2$ is in a range of 1.10 to 1.15.

Figure 2:
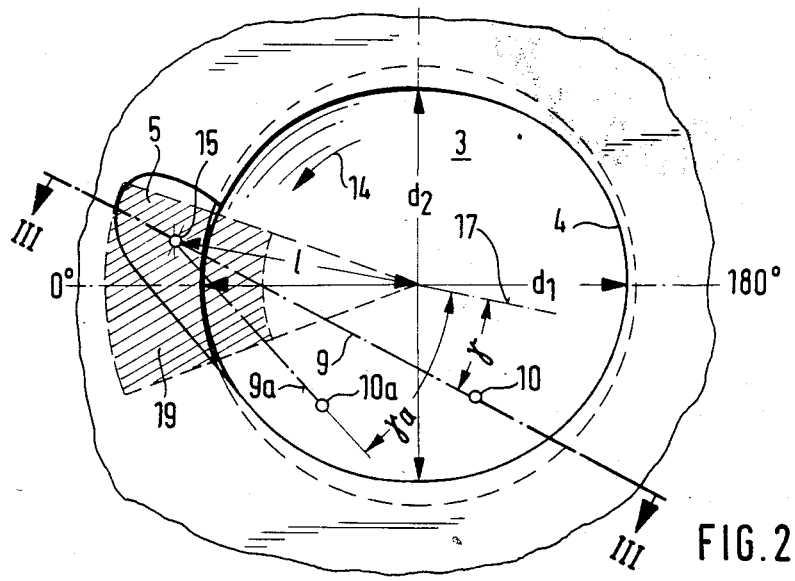
FIG. 2 is a plan view of a piston taken along line II—II in FIG. 1.

Referring now to the drawings in detail, FIGS. 1 and 2 in part show a piston 1 having a spherical combustion chamber 3 with a diameter D in the piston crown 2. The combustion chamber 3, which may also be a shape other than a rotationally symmetrical one, communicates by means of a constricted throat opening 4 with the cylinder space 12. In the necked throat opening 4, which is formed with an oval-shaped cross-section in the form of an ellipse or an oblong hole, there is provided a recess or entrant section 5 for the injection of the fuel by means of an injection nozzle or injector 7 which is located in the cylinder head 6 in an off-center position relative to the longitudinal axis 13 of the combustion chamber. Due to the oval shape of the throat opening 4, the entrant section is not mandatory.

The equator level of the combustion chamber 3 is indicated by a dash-dot line 8. The injection of the fuel is effected into the lower quarter of the combustion chamber 3. This is achieved by adopting an appropriate angle of the nozzle (deviation of fuel jet from nozzle centerline), or appropriate selection of the nozzle position and/or appropriate rotation of the injector. Injecting the fuel into the lower area of the combustion chamber results in a greater free trajectory of the fuel jet.

The lines 9 and 9a indicate the direction of two geometrical fuel jets which impinge on the combustion chamber wall 11 at the points 10 and 10a. According to the invention, the fuel jet direction is chosen in such a way that the geometrical fuel jet, projected into a plane perpendicular to the combustion chamber longitudinal axis 13, forms an angle $\gamma$ ranging between 10° and 50° with a straight line 17 which extends from the fuel discharge point 15 through the combustion chamber longitudinal axis 13 (combustion chamber center), and, furthermore, forms an angle $\delta$ in a range of 20° to 60° relative to a plane 16 which is perpendicular to the combustion chamber longitudinal axis 13, for instance the cylinder head plane.

In the embodiment illustrated, a $\gamma$ value of about 17° results for the fuel jet 9, and a $\gamma_a$ value of about 38° results for the fuel jet 9a.

FIG. 2 shows an elliptical throat opening 4. The major diameter of the ellipse is designated $d_1$, and the minor diameter $d_2$. The diameter ratio $d_1/d_2$ is in a range between 1.05 and 1.25. The fuel discharge point 15 is located in the end region of the major diameter $d_1$, and may be inside the area 19. The point 15 may deviate by ±20° from the direction of the major diameter $d_1$; in the embodiment illustrated, the deviation is about 10°. The distance of the fuel discharge point 15 from the combustion chamber center is designated $\zeta$, and may amount to 0.35 to 0.70 times the combustion chamber diameter D. In the embodiment illustrated, $\zeta$ is about 0.55D. The arrow 14 indicates the direction of air rotation.

If the position of the fuel discharge point 15 is varied within the area 19 shown hatched in FIG. 2, a different impingement point of the fuel jet will result in each case on the combustion chamber wall 11, but the angle values for $\gamma$ and $\delta$ will remain approximately the same, provided the other conditions, such as the nozzle angle, are retained. This is entirely true only for a spherical combustion chamber, where the best results are obtained if the distance ($\zeta$) of the fuel discharge point 15 from the combustion chamber center is 0.50 to 0.55 times the combustion chamber diameter D, the angle $\gamma$ is in a range between 15° and 40°, and the angle $\delta$ is in a range between 40° and 50°, and where the diameter ratio $d_1/d_2$ of the oval combustion chamber throat is 1.10 to 1.15.

Figure 3:
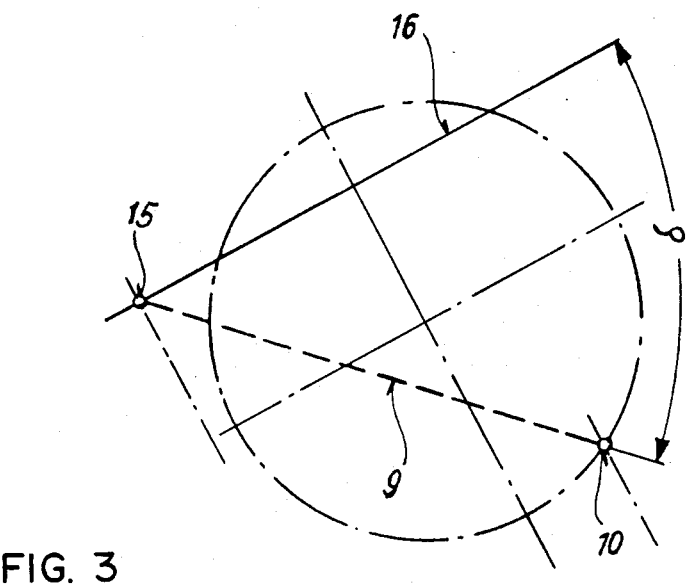
FIG. 3 is a section, in the plane of one of the fuel jets, taken along the line III—III in FIG. 2 (auxiliary diagram)

FIG. 3 shows the $\delta$ angle value for the fuel jet 9. In the figure, this is approximately 45°. This figure also shows the actual trajectory of the geometrical fuel jet 9, which impinges on the combustion chamber wall at point 10. The point 10 is situated on a circle which is obtained as an intersection of the plane III—III according to FIG. 2 with the spherical combustion chamber. FIG. 3 only serves as an auxiliary diagram to represent the angle δ, with the plane perpendicular or at a right angle relative to the cylinder axis, e.g. the cylinder head plane, being designated by 16.

Figure 4:
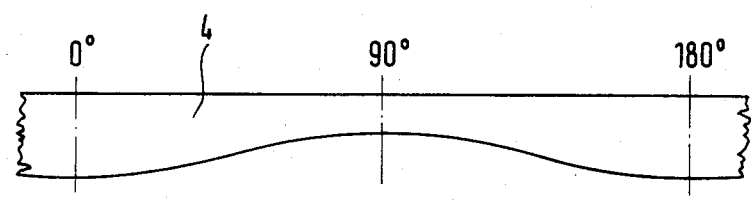
FIG. 4 is a development of the throat wall depth over an angular range of 0° to 180°.

FIG. 4 shows the development of the wall depth of the throat opening 4 over an angle in a range of 0° to 180°.

Applied to an internal combustion engine of the type initially referred to, the present invention enables mixture formation to be automatically produced as desired with straightforward means, i.e. by the optical configuration of the combustion chamber throat in conjunction with specified preconditions for the injection of the fuel into the combustion chamber, with the transition from part load to full load also being effected with mixture formation automatically matched to provide the necessary air distribution or wall deposition of the fuel as required. There is no need for special mechanical aids and/or control action to be provided externally to achieve this effect. Moreover, it is not necessary for the swirling revolutions per second or rps of the air to be maintained within as narrow bands as in the case of the prior art (German Pat. No. 20 38 048 corresponding to U.S. Pat. No. 3,814,066—Löhr issued June 4, 1974).

The present invention is, of course, in no way restricted to the specific disclosure of the specification and drawings, but also encompasses any modifications within the scope of the appended claims.

What we claim is:

1. An internal combustion engine, each piston of which has a crown and a combustion chamber including a longitudinal axis as well as a wall in a circumferential direction along with a lower quarter of the combustion chamber and being in the shape of a solid of revolution and having a constricted throat opening of oval cross section with a major diameter as well as a minor diameter and a varying wall height in the circumferential direction, said throat opening including an edge and being located in the crown of said piston and opening in the direction toward an associated cylinder head; means are provided for imparting a rotary motion, about the longitudinal axis of said combustion chamber, to in-flowing air for combustion; an injection nozzle is arranged off-center in said cylinder head in the vicinity of the edge of said throat opening and has a fuel jet discharge point communicating with said combustion chamber for injecting fuel therein, said fuel being injected into said combustion chamber in the form of a single jet, in the direction of rotating air for combustion, in such a way as to permit formation of a fuel film on the wall of said combustion chamber, with the point of impingement of said fuel jet on the wall of said combustion chamber being located in the lower quarter of said combustion chamber by appropriate selection of the nozzle angle and nozzle position; viewing said combustion chamber in a top view thereof, the major diameter of said throat opening, across the center of said combustion chamber, extends in the direction toward said fuel jet discharge point of said injection nozzle, with the distance of said fuel jet discharge point from the center of said combustion chamber being 0.35 to 0.70 times the diameter of said combustion chamber, and with the direction of a fuel jet, on the one hand being geometrically projected in a plane intersecting at a right angle to the longitudinal axis of said combustion chamber, forming an angle of 10° to 50° with a straight line extending from said fuel jet discharge point through the longitudinal axis of said combustion chamber (center of said combustion chamber), and on the other hand forming an angle of 20° to 60° with a plane intersecting at a right angle to the longitudinal axis of said combustion chamber; said combustion chamber being spherical; the distance of said fuel jet discharge point from the center of said combustion chamber being 0.50 to 0.55 times the diameter of said combustion chamber; said angle of said direction of a fuel jet with said straight line from said fuel jet discharge point being between 15° and 40°; said angle of said direction of a fuel jet with a plane at a right angle to the longitudinal axis of said combustion chamber being between 40° and 50°; and the ratio of the major diameter of said oval throat opening to the minor diameter thereof being in a range from 1.10 to 1.15.

2. An internal combustion engine according to claim 1, in which the depth of the wall of said throat opening is greatest in the regions of the major diameter of said throat opening, and is smallest in the regions of the minor diameter thereof.

3. An internal combustion engine according to claim 2, in which the greatest depth of the wall of said throat opening ranges within 15 to 20% of the diameter of said combustion chamber, and the smallest depth of the wall of said throat opening ranges within 5 to 10% of the diameter of said combustion chamber.

4. An internal combustion engine according to claim 1, in which the location of said fuel jet discharge point varies by a maximum of ±20° from the direction of said major diameter of said throat opening.

5. An internal combustion engine according to claim 1, in which said throat opening is in the form of an ellipse.

6. An internal combustion engine according to claim 1, in which said throat opening is in the form of an oblong hole formed from two semicircles and a straight intermediate area in the middle.

7. An internal combustion engine according to claim 1, in which the surface of the wall of said throat opening is parallel to the longitudinal axis of said combustion chamber.

8. An internal combustion engine according to claim 1, in which the rotary speed of revolving air for combustion—relative to the diameter of said combustion chamber (0.7 cylinder or piston diameter), maximum valve lift, and 10 m/sec mean piston velocity—is between 130 and 180 cps.

9. An air-compressing, direct-injection internal combustion engine the improvement in combination therewith wherein, each piston of which has a crown and a combustion chamber including a longitudinal axis as well as a wall in circumferential direction along with a lower quarter of the combustion chamber and being in the shape of a solid of revolution and having a constricted throat opening of oval cross section with a major diameter as well as a minor diameter and a varying wall height in the circumferential direction, said throat opening including an edge and being located in the crown of said piston and opening in the direction toward an associated cylinder head; means are provided for imparting a rotary motion, about the longitudinal axis of said combustion chamber, to in-flowing air for combustion; an injection nozzle is arranged off-center in said cylinder head in the vicinity of the edge of said throat opening and has a fuel jet discharge point communicating with said combustion chamber for injecting fuel therein, said fuel being injected into said combustion chamber in the form of a single jet, in the direction of rotating air for combustion, in such a way as to permit formation of a fuel film on the wall of said combustion chamber, with the point of impingement of said fuel jet on the wall of said combustion chamber being located in the lower quarter of said combustion chamber by appropriate selection of the nozzle angle and nozzle position; viewing said combustion chamber in a top view thereof, the major diameter of said throat opening, across the center of said combustion chamber, extends in the direction toward said fule jet discharge point of said injection nozzle, with the distance of said fuel jet discharge point from the center of said combustion chamber being 0.35 to b 0.70 times the diameter of said combustion chamber, and with the direction of a fuel jet, on the one hand being geometrically projected in a plane intersecting at a right angle to the longitudinal axis of said combustion chamber, forming an angle of 10° to 50° with a straight line extending from said fuel jet discharge point through the longitudinal axis of said combustion chamber (center of said combustion chamber), and on the other hand forming an angle of 20° to 60° with a plane intersecting at a right angle to the longitudinal axis of said combustion chamber, such that the location of said fuel jet discharge point varies by a maximum of ±20° from the direction of said major diameter of said throat opening.

10. An internal combustion engine, in combination according to claim 9, in which the ratio of the major diameter of said oval throat opening to the minor diameter thereof is in a range from 1.05 to 1.25.

* * * * *